(12) United States Patent
Fackrell et al.

(10) Patent No.: US 12,656,025 B2
(45) **Date of Patent: \*Jun. 16, 2026**

(54) AUTOMATED STIRLING PELTIER LIQUID AIR BATTERY

(71) Applicant: THE UNITED STATES OF AMERICA, AS REPRESENTED BY THE SECRETARY OF THE NAVY, Arlington, VA (US)

(72) Inventors: Christopher Joseph Fackrell, Monterey, CA (US); Frank Chase Smeeks, IV, Marina, CA (US); Denntrick Akeem Horton, New Orleans, LA (US); Steven Wayne Arnold, Monterey, CA (US); Jasmine Tequila Sweet, Monterey, CA (US); Anthony Gerard Pollman, Monterey, CA (US)

(73) Assignee: The Government of the United States of America, as represented by the Secretary of the Navy, Arlington, VA (US)

( \* ) Notice: Subject to any disclaimer, the term of this patent is extended or adjusted under 35 U.S.C. 154(b) by 304 days.

This patent is subject to a terminal disclaimer.

(21) Appl. No.: 18/535,896

(22) Filed: Dec. 11, 2023

(65) Prior Publication Data

US 2024/0191912 A1 Jun. 13, 2024

Related U.S. Application Data

(60) Provisional application No. 63/431,631, filed on Dec. 9, 2022.

(51) Int. Cl.
*F25B 9/14* (2006.01)
*F25B 21/00* (2006.01)
(Continued)

(52) U.S. Cl.
CPC ............... *F25B 9/14* (2013.01); *F25B 21/00* (2013.01); *F25J 1/0012* (2013.01);
(Continued)

(58) Field of Classification Search
CPC .. F25B 9/14; F25B 9/145; F25J 1/0012; F25J 2270/912
See application file for complete search history.

(56) References Cited

U.S. PATENT DOCUMENTS

| | | | | | |
|---|---|---|---|---|---|
| 4,059,424 | A | * | 11/1977 | Bentz | F17C 9/00 137/392 |
| 6,408,640 | B1 | * | 6/2002 | Garrett | F25D 3/10 62/51.1 |

(Continued)

FOREIGN PATENT DOCUMENTS

| | | | | | |
|---|---|---|---|---|---|
| CN | 211855822 | U | * | 11/2020 | |
| CN | 112855291 | A | * | 5/2021 | F01D 25/30 |
| WO | WO-2018130843 | A1 | * | 7/2018 | F24D 18/00 |

*Primary Examiner* — Brian M King
(74) *Attorney, Agent, or Firm* — Heber Martin Carbajal; Scott Bell

(57) ABSTRACT

An automated Stirling Peltier liquid air battery includes: a cryocooler to cool a tip of a cold head to cryogenic temperatures, the cryocooler resting in a cryocooler support; the cryocooler support to change a level of the cryocooler in a dewar to maximize liquid air production, the dewar to hold the liquified air at low temperatures, the dewar having the cryocooler support, wherein the dewar further comprises: a polytetrafluoroethylene or glass inner shell that reduces conductive heat loss, and a polytetrafluoroethylene or glass threaded pipe connected to a liquid air transport subsystem; and the liquid air transport subsystem having a thermoelectric generator to generate output electricity from the liquid air received from the dewar.

18 Claims, 25 Drawing Sheets

(51) Int. Cl.
   F25J 1/00       (2006.01)
   H04L 9/32     (2006.01)

(52) U.S. Cl.
   CPC ......... H04L 9/3218 (2013.01); *F25J 2270/91*
       (2013.01); *F25J 2270/912* (2013.01); *G06Q*
     *2220/10* (2013.01); *H04L 2209/603* (2013.01)

(56)          References Cited

U.S. PATENT DOCUMENTS

| | | | |
|---|---|---|---|
| 10,355,189 B2 * | 7/2019 | Lee | H10N 10/17 |
| 11,692,508 B2 | 7/2023 | Bailey et al. | |
| 2001/0011459 A1 * | 8/2001 | Rudick | A47F 3/0408 |
| | | | 60/520 |
| 2006/0022779 A1 * | 2/2006 | Jiang | H01F 6/04 |
| | | | 335/216 |
| 2006/0068993 A1 * | 3/2006 | Egan | F17C 3/08 |
| | | | 505/211 |
| 2015/0033674 A1 * | 2/2015 | Downie | F17C 5/06 |
| | | | 141/59 |
| 2015/0033765 A1 * | 2/2015 | Blalock | F17C 7/04 |
| | | | 62/47.1 |
| 2017/0299673 A1 * | 10/2017 | Wikus | F25B 9/145 |
| 2019/0137037 A1 * | 5/2019 | Gehlhausen | F17C 13/004 |
| 2020/0011483 A1 * | 1/2020 | Alzaydi | F17C 1/14 |
| 2020/0103866 A1 * | 4/2020 | Menzel | G05B 19/4185 |
| 2020/0166247 A1 * | 5/2020 | Hirayama | F25D 19/00 |
| 2020/0378556 A1 * | 12/2020 | Wowk | F17C 1/12 |
| 2021/0408353 A1 * | 12/2021 | Schnurr | F04D 25/06 |

\* cited by examiner

321

322

323

426

428

427

429

531　　　526

651

657

656

652

655

654

653

653

661

662

654

663

664

655

665

656

668

669

667

666

657

671

672

Main CCW Program

```
// LAESRS Master Control Program  08 SEP 22
// Author: LT Chase Smeeks

// RTD Subsection
TEMP1 := ANY_TO_REAL(_IO_P2_AI_00);  //Temp Probe 1 Value
TEMP2 := ANY_TO_REAL(_IO_P2_AI_01);  //Temp Probe 2 Value
TEMP3 := ANY_TO_REAL(_IO_P3_AI_00);  //Temp Probe 3 Value
TEMP4 := ANY_TO_REAL(_IO_P3_AI_01);  //Temp Probe 4 Value TEMP1C := (TEMP1-2700.0)/10.0;    //Temp Probe 1 Deg Celsius
TEMP2C := (TEMP2-2700.0)/10.0;    //Temp Probe 2 Deg Celsius
TEMP3C := (TEMP3-2700.0)/10.0;    //Temp Probe 3 Deg Celsius
TEMP4C := (TEMP4-2700.0)/10.0;    //Temp Probe 4 Deg Celsius //cap_volt_real := ANY_TO_REAL(modbus_buffer[1]);
//pv_volt_real  := ANY_TO_REAL(modbus_buffer[2]);

// Microgrid Modbus Reading Subsection
cap_volt := (ANY_TO_REAL(modbus_buffer[1]))/10.0;   //Real time capacitor
voltage from charge controller updated every 10s
pv_volt  := (ANY_TO_REAL(modbus_buffer[2]))/10.0;   //Real time photovolatic
array voltage from charge controller updated every 10s MSG_MODBUS2_1(read_modbus, modbus_cancel, modbus_location,
modbus_target, modbus_buffer);   //input, cancel, local config, target config, local
address //output := MSG_MODBUS2_1.Q;
//input := MSG_MODBUS2_1.Error;
//ID := MSG_MODBUS2_1.ErrorID;

//CryoCooler and Solenoid Valve Control Subsection
IF cap_volt > 42.0  THEN   //If Temp Probe 1 reads less than 24 degC then turn on
cryocooler (AND Voltage < 54.0 once get voltages)
   _IO_P1_AO_00 := 0;   //Start or leave CryoCooler online
ELSE
   _IO_P1_AO_00 := 32899;  //32767=5v nominal 32900=5v actual/observed (Stop
CryoCooler)
END_IF;
```

FIG. 15

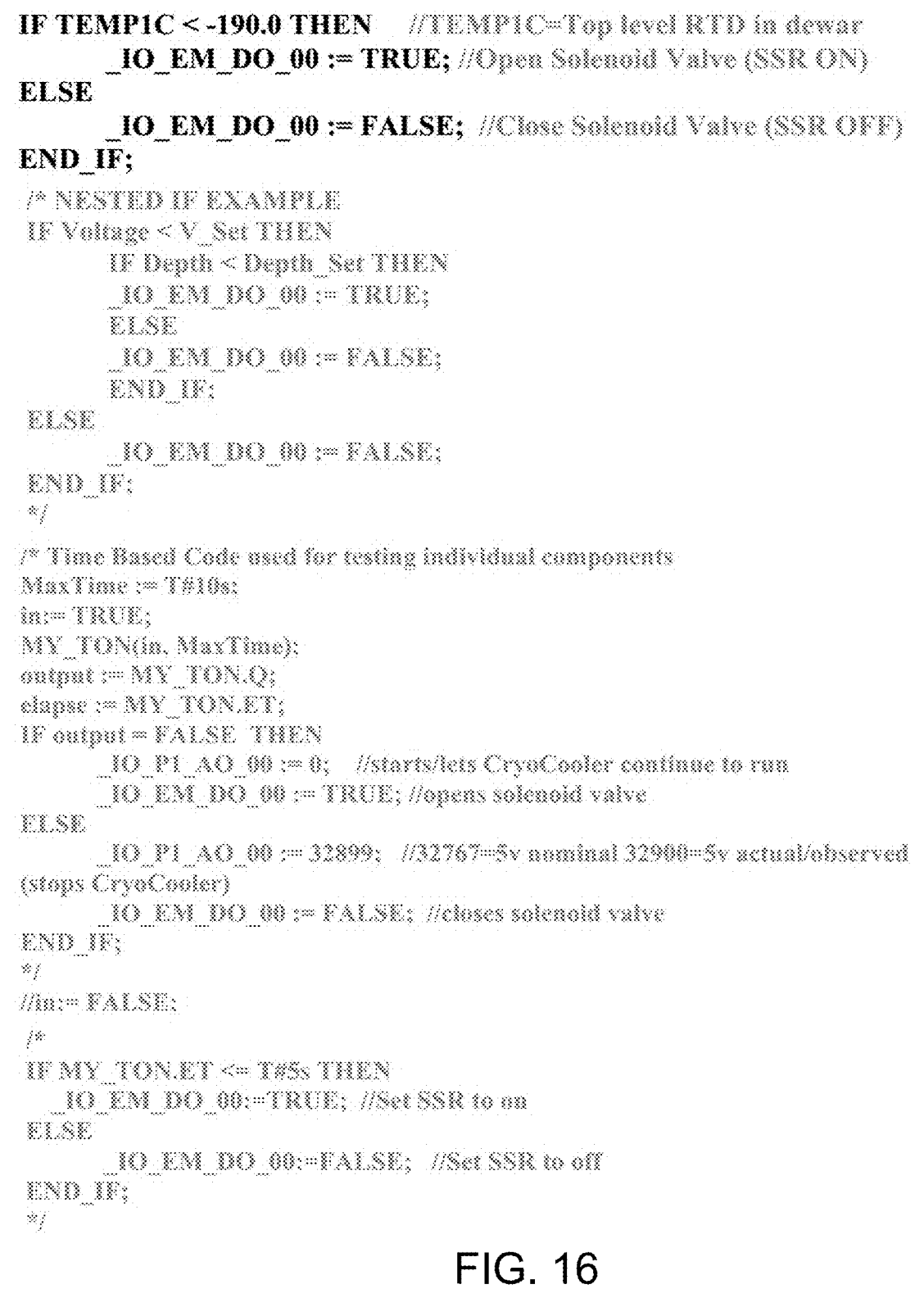

```
IF TEMP1C < -190.0 THEN    //TEMP1C=Top level RTD in dewar
        _IO_EM_DO_00 := TRUE; //Open Solenoid Valve (SSR ON)
ELSE
        _IO_EM_DO_00 := FALSE;  //Close Solenoid Valve (SSR OFF)
END_IF;
/* NESTED IF EXAMPLE
IF Voltage < V_Set THEN
        IF Depth < Depth_Set THEN
        _IO_EM_DO_00 := TRUE;
        ELSE
        _IO_EM_DO_00 := FALSE;
        END_IF;
ELSE
        _IO_EM_DO_00 := FALSE;
END_IF;
*/

/* Time Based Code used for testing individual components
MaxTime := T#10s;
in:= TRUE;
MY_TON(in, MaxTime);
output := MY_TON.Q;
elapse := MY_TON.ET;
IF output = FALSE  THEN
        _IO_P1_AO_00 := 0;   //starts/lets CryoCooler continue to run
        _IO_EM_DO_00 := TRUE; //opens solenoid valve
ELSE
        _IO_P1_AO_00 := 32899;   //32767=5v nominal 32900=5v actual/observed
(stops CryoCooler)
        _IO_EM_DO_00 := FALSE; //closes solenoid valve
END_IF;
*/
//in:= FALSE;
/*
IF MY_TON.ET <= T#5s THEN
   _IO_EM_DO_00:=TRUE;  //Set SSR to on
ELSE
        _IO_EM_DO_00:=FALSE;   //Set SSR to off
END_IF;
*/
```

FIG. 16

MAIN PROGRAM CCW VARIABLES

User Global Variables - Micro850    Local Variables - N/A    System Variables - Micro850    I/O - Micro850

| Name | Alias | Data Type | Dimension | Initial Value | |
|---|---|---|---|---|---|
| TEMP1 | | REAL | | | |
| TEMP2 | | REAL | | | |
| TEMP3 | | REAL | | | |
| TEMP4 | | REAL | | | |
| TEMP1C | | REAL | | | |
| TEMP2C | | REAL | | | |
| TEMP3C | | REAL | | | |
| TEMP4C | | REAL | | | |
| MSG_MODBUS2_1 | | MSG_MODE | | | |
| modbus_buffer | | MODBUSLO | | | |
| modbus_location | | MODBUS2L | | | |
| modbus_target | | MODBUS2T | | | |
| read_modbus | | BOOL | | TRUE | |
| modbus_cancel | | BOOL | | FALSE | |
| cap_volt | | REAL | | | |
| pv_volt | | REAL | | | |

MAIN PROGRAM MATLAB

```
%% LAESRS Modbus Data Collection Program 08 SEP 2022
% Author: LT Chase Smeeks close all, clear all, clc;
ipaddress = '███████████';    %Ensure current IP address
for PLC
                              %inputted here to connect
Modbus
m = modbus('tcpip',ipaddress)    %Opens Modbus
Connection to PLC % PLC = read(m,'holdingregs',2,6,1,'single') % read
modbus command
```

FIG. 17

```
% Create file to write data to
filename = ['microgriddatatest.xls'];
fid = fopen(filename, 'a');

% Write first line to data file which is the title for
each column.
Title = {'RTD 1 Temperature (C)' 'RTD 2 Temperature
(C)' ...
  'RTD 3 Temperature (C)' 'RTD 4 Temperature (C)' ...

'Supercapacitor Voltage' 'Photovolatic Array
Voltage'};

for ii = 1:length(Title)
fprintf(fid,'%s\t',Title{ii}); %Tells matlab to print
each element of the
                            %array to a single cell.
end
fprintf(fid,'\n'); %Skips to the next line t = 0:10:86400;   %change to align with pauselen and
time for while loop
                  %below
PLCD = zeros(8641,6);  %change first value to align
with how many
                        %measurements taken for total
time in while loop %while statemenet
time = 0;            %initialize time
pauselen = 10;       % desired time between data
recordings in seconds
while time <= (24*60*60)    %time you want to record
data in seconds
  tic;
```

FIG. 18

```
   PLC = read(m,'holdingregs',2,6,1,'single') %400001 is
the number assigned
   %to the address in modbus for CCW variable you are
trying to record and
   %this coorelates to 2
   for i = 1:length(PLC)  %print each data recording
into file as a row
       fprintf(fid, '%s\t', PLC(i));
   end
   fprintf(fid, '\n');

for iii = 1:8641     %Change second number to
appropriate number of data
                       %recordings for total time of
while loop
       PLCD(iii,:)=[PLC(1) PLC(2) PLC(3) PLC(4) PLC(5)
PLC(6)];
   end toc;
   pause(pauselen-toc);
   time= time + pauselen;  %reset new time
end
fclose(fid);  %closes file figure    %plots all six modbus variables for temp and
voltage
subplot(3,2,1)
plot(t, PLCD(:,1), '-db','MarkerFaceColor','g');
hold on
title ('RTD 1 Temperature (C)')
xlabel ('time (s)')
ylabel ('Temperature, C')
axis ([0 86400 -196 24])
```

FIG. 19

```
subplot(3,2,2)
plot(t, PLCD(:,2), '-db','MarkerFaceColor','g');
hold on
title ('RTD 2 Temperature (C)')
xlabel ('time (s)')
ylabel ('Temperature, C')
axis ([0 86400 -196 24])

subplot(3,2,3)
plot(t, PLCD(:,3), '-db','MarkerFaceColor','g');
hold on
title ('RTD 3 Temperature (C)')
xlabel ('time (s)')
ylabel ('Temperature, C')
axis ([0 86400 -196 24])

subplot(3,2,4)
plot(t, PLCD(:,4), '-db','MarkerFaceColor','g');
hold on
title ('RTD 4 Temperature (C)')
xlabel ('time (s)')
ylabel ('Temperature, C')
axis ([0 86400 -196 24])

subplot(3,2,5)
plot(t, PLCD(:,5), '-db','MarkerFaceColor','g');
hold on
title ('Supercapacitor Voltage (V)')
```

FIG. 20

```
xlabel ('time (s)')
ylabel ('Voltage (V)')
axis ([0 86400 30 55])

subplot(3,2,6)
plot(t, PLCD(:,6), '-db','MarkerFaceColor','g');
hold on
title ('Photovolatic Array Voltage (V)')
xlabel ('time (s)')
ylabel ('Voltage (V)')
axis ([0 86400 60 80])

% D = xlsread('microgriddatatest.xls'); %automatically
opens excel data
% file
```

FIG. 21

AUTOMATED STIRLING PELTIER LIQUID AIR BATTERY

CROSS-REFERENCE TO RELATED APPLICATIONS

The present application claims priority to U.S. Provisional Patent Application Ser. No. 63/431,631, filed Dec. 9, 2022, which is incorporated by reference herein in its entirety.

BACKGROUND

The Department of Defense is interested in islanded, renewable energy microgrids for use at remote operating bases to reduce logistics burdens associated with fossil fuel based electrical power sources. However, islanded, renewable micro-grids suffer from intermittent energy generation which necessitates the use of some type of energy storage. Liquid air energy storage is one promising solution. Liquid air energy storage systems store excess energy on a microgrid by producing liquid air and storing it until the microgrid experiences an electrical demand greater than electrical production, at which point energy is extracted from liquid air and converted back into electrical power. The energy generated in excess of immediate demand is used to run a cycle or process to liquify ambient air and store it in an insulated container or dewar. Then, when demand exceeds generation on the islanded microgrid, the liquid air is used to run a cycle or process to generate electrical energy.

Liquid air energy storage is currently an industrial-sized process, and typically utilizes a high-pressure thermodynamic cycle such as Linde-Hampson for liquification and a high-pressure thermodynamic cycle such as Rankine for energy recovery. These processes do not work well in small-scale applications, such as building-scale microgrids.

A recent patent by Bailey et al., issued as U.S. Pat. No. 11,692,508 on Jul. 4, 2023, suggested using a Stirling cycle for liquification and a Stirling cycle for energy generation for a liquified air energy storage system designed to operate on small microgrids. Another recent patent application by Fackrell et al., published as US 2023/0375262 A1 on Nov. 23, 2023, discloses a new dewar design. U.S. Pat. No. 11,692,508 and US 2023/0375262 A1 are incorporated by reference in their entireties except for any definitions, disclaimers, disavowals, and inconsistencies. It should be understood that various aspects of one or both of these applications may be applied to the liquid air energy storage systems and methods of the present disclosure.

It would be beneficial to develop new liquid air energy systems suitable for islanded, renewable energy microgrids.

BRIEF DESCRIPTION

The present disclosure relates to an automated Stirling Peltier liquid air battery.

Disclosed, in some embodiments, is an automated Stirling Peltier liquid air battery including: a cryocooler to cool a tip of a cold head to cryogenic temperatures, the cryocooler resting in a cryocooler support; the cryocooler support to change a level of the cryocooler in a dewar to maximize liquid air production, the dewar to hold the liquified air at low temperatures, the dewar having the cryocooler support, wherein the dewar further comprises: a polytetrafluoroethylene or glass inner shell that reduces conductive heat loss, and a polytetrafluoroethylene or glass threaded pipe connected to a liquid air transport subsystem; and the liquid air transport subsystem connected to a thermoelectric generator to generate output electricity from the liquid air received from the dewar.

In some embodiments, the cryocooler is positioned above the dewar and the dewar is positioned above the liquid air transport subsystem such that the liquid air is moved by gravity.

The dewar may further include a vacuum ball valve attached to an outer dewar shell to create a vacuum that reduces conductive heat transfer from the outer to the inner dewar shells.

In some embodiments, the battery further includes a thermoelectric-generator powered fan to cool a heatsink of the cryocooler, the thermoelectric-generator having a temperature differential from heat dissipated by the heatsink.

The dewar may further include an integrated, annular ring fitted in an upper cryocooler cavity of the dewar.

In some embodiments, inner shell of the dewar is covered with a metal layer.

The dewar may further include an outer shell; and an air gap between the inner shell and the outer shell.

In some embodiments, the dewar further includes: an integrated, annular ring fitted in an upper cryocooler cavity of the dewar; first air holes in an outer shell at the integrated, annular ring; and second air holes in the inner shell at the integrated, annular ring.

The outer shell may contain stainless steel.

In some embodiments, the inner shell comprises polytetrafluoroethylene.

Disclosed, in other embodiments, is a liquid air energy storage and recovery system comprising: a liquid air production subsystem; a liquid air storage subsystem in fluid communication with the liquid air production subsystem; an energy recovery subsystem in fluid communication with the liquid air storage subsystem; a liquid air transport subsystem configured to transport liquid air from the liquid air storage subsystem to the energy recovery subsystem; and a control subsystem for controlling aspects of the liquid air production subsystem; the liquid air storage subsystem the energy recovery subsystem in fluid communication with the liquid air storage subsystem; and the liquid air transport subsystem.

The liquid air production subsystem, liquid air storage subsystem, and energy recovery subsystem may be arranged in sequence from top to bottom.

In some embodiments, the liquid air production subsystem includes a cryocooler.

The liquid air storage subsystem may include a dewar having a polytetrafluoroethylene or glass inner shell that reduces conductive heat loss, and a polytetrafluoroethylene or glass threaded pipe connected to the liquid air transport subsystem.

In some embodiments, the liquid air transport subsystem comprises a solenoid valve.

The energy recovery subsystem may further include a thermoelectric generator.

In some embodiments, the energy recovery subsystem includes an array of thermoelectric generators.

The system may further include a container for housing the TEG array.

In some embodiments, the container includes a container body and a container lid.

In some embodiments, the control subsystem comprises a Programmable Logic Controller (PLC) and structured text code that controls the generation, storage, and power recovery of liquid air in the system.

Still other objects of the disclosure will become apparent upon a reading and understanding of the following detailed description

BRIEF DESCRIPTION OF THE DRAWINGS

The following is a brief description of the drawings, which are presented for the purposes of illustrating the exemplary embodiments disclosed herein and not for the purposes of limiting the same.

FIG. 15 is a first page of control system code for a non-limiting example of the present disclosure.

FIG. 16 is a second page of control system code for a non-limiting example of the present disclosure.

FIG. 17 is a third page of control system code for a non-limiting example of the present disclosure.

FIG. 18 is a fourth page of control system code for a non-limiting example of the present disclosure.

FIG. 19 is a fifth page of control system code for a non-limiting example of the present disclosure.

FIG. 20 is a sixth page of control system code for a non-limiting example of the present disclosure.

FIG. 21 is a seventh page of control system code for a non-limiting example of the present disclosure.

DETAILED DESCRIPTION

Figure 1:
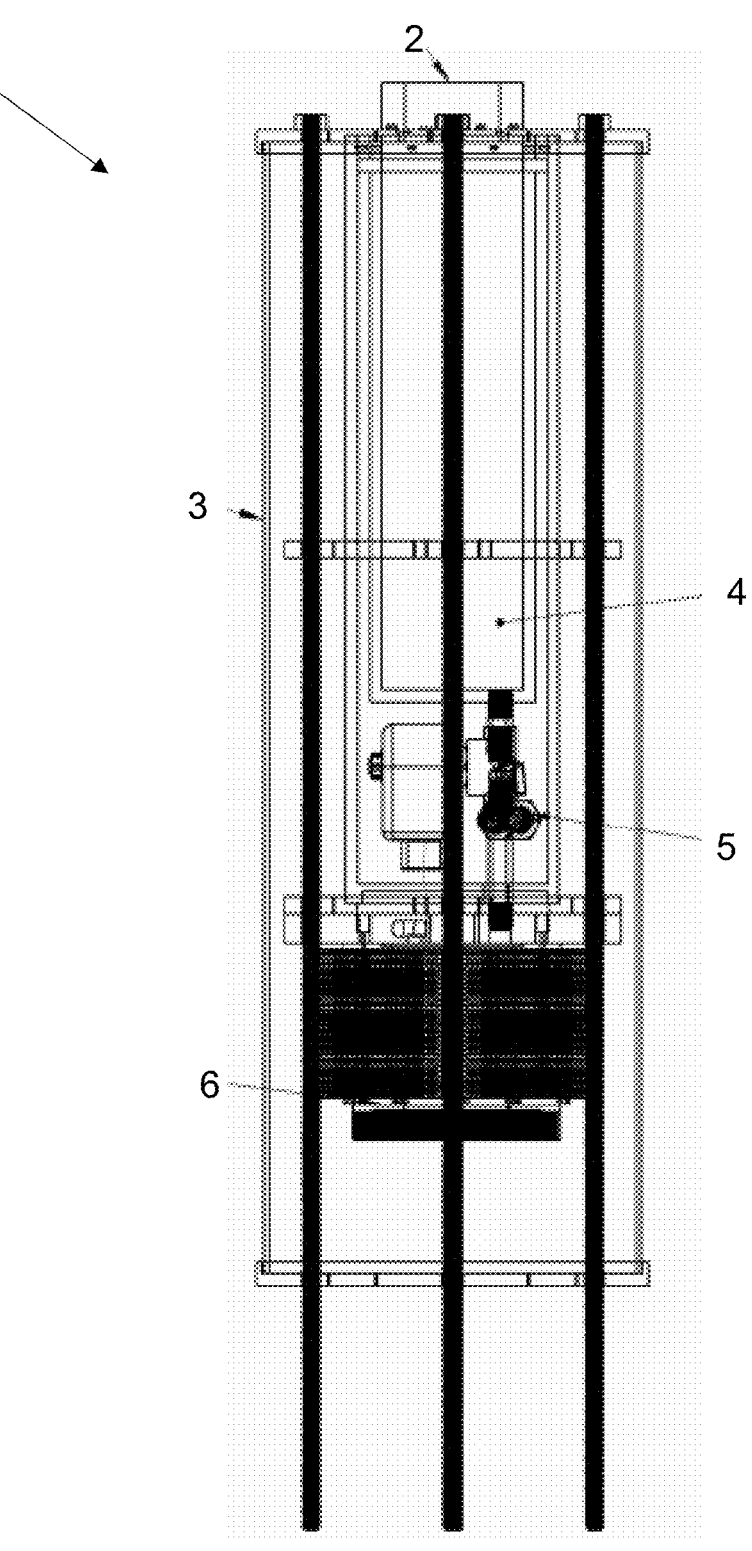
FIG. 1 is a side cross-sectional view of a portion of a liquid air energy storage and recovery system in accordance with some embodiments of the present disclosure.

The present disclosure may be understood more readily by reference to the following detailed description of desired embodiments included therein, the drawings. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure relates to a containerized Liquid Air Energy Storage and Recovery System (LAESRS). The LAESRS include a liquid air production subsystem, a liquid air storage subsystem (e.g., a dewar), a liquid air transportation subsystem, an energy recovery subsystem, and a control subsystem.

FIG. 1 illustrates a non-limiting embodiment of a liquid air energy storage and recovery system 1 in accordance with some embodiments of the present disclosure. The system 1 includes a cryocooler attachment point 2, structural support 3, a dewar 4, a transport subsystem 5, and an energy recovery subsystem 6.

Liquid Air Production Subsystem

Liquid air production may be accomplished using a commercial off-the-shelf cryocooler. The cryocooler rests on a cryocooler support, which elevates the cold finger in the dewar to maximize the amount of liquid air produced prior to coming in contact with the dewar. Two TEG powered fans may be affixed to the LAESRS top support plate to provide cooling to the cryocooler heatsinks, with the temperature differential for the TEG coming from the heat dissipated by these same cryocooler heatsinks.

Liquid Air Storage Subsystem

The liquid air storage subsystem receives liquid air from the liquid air production subsystem and stores it in a dewar until energy recovery, in the form of electricity, is necessary.

The dewar utilized in the systems and methods of the present disclosure may be a two opening dewar, with a top opening configured to be associated with a cryocooler to produce LA and a second penetration of the dewar at the bottom used for a power recovery cycle. This design reduces the width of the upper dewar neck, reducing convection from the surface of the LA while also reducing the higher conductivity associated with a wider dewar mouth. The lower port allows for energy extraction from the LA's entire stored volume as it evaporates without the need for an extended cold side for an attached Stirling generator. Additionally, this dewar configuration could be adapted to other low pressure energy recovery methods, such as a thermoelectric generator.

Figure 1A:
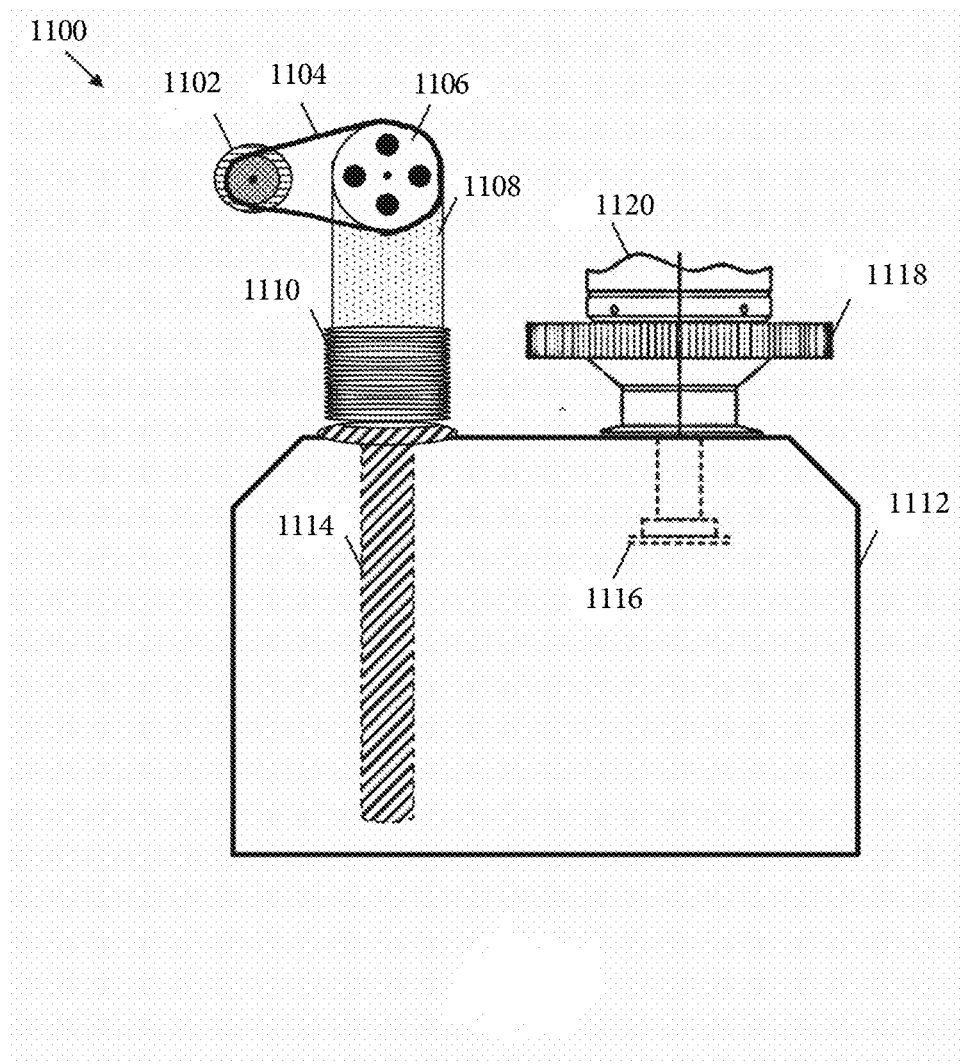
FIG. 1A is an illustration of an alternate embodiment of a liquid air energy storage (LAES) system.
Figure 2A:
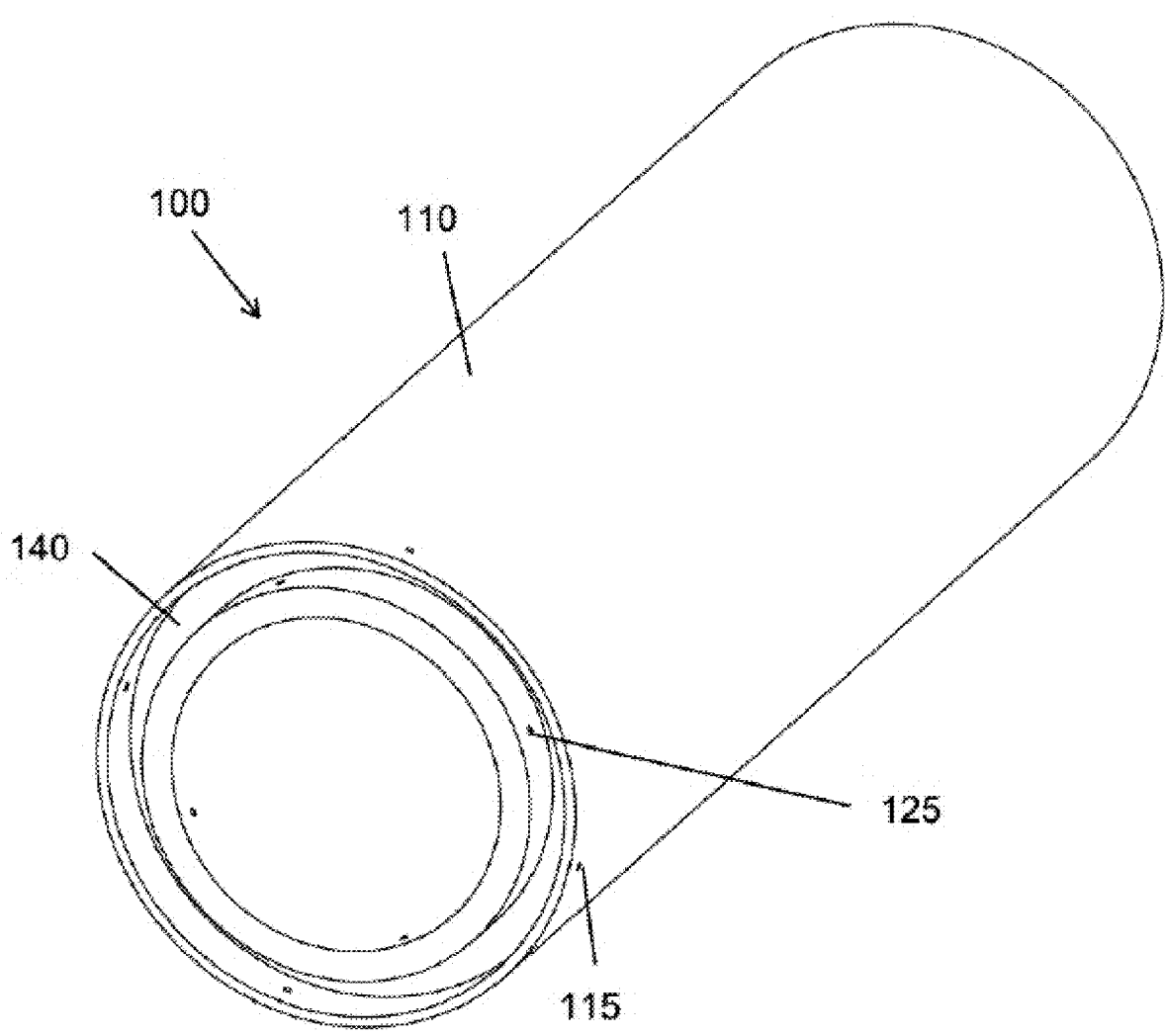
FIG. 2A is a front perspective view of a dewar in accordance with some embodiments of the present disclosure.
Figure 2B:
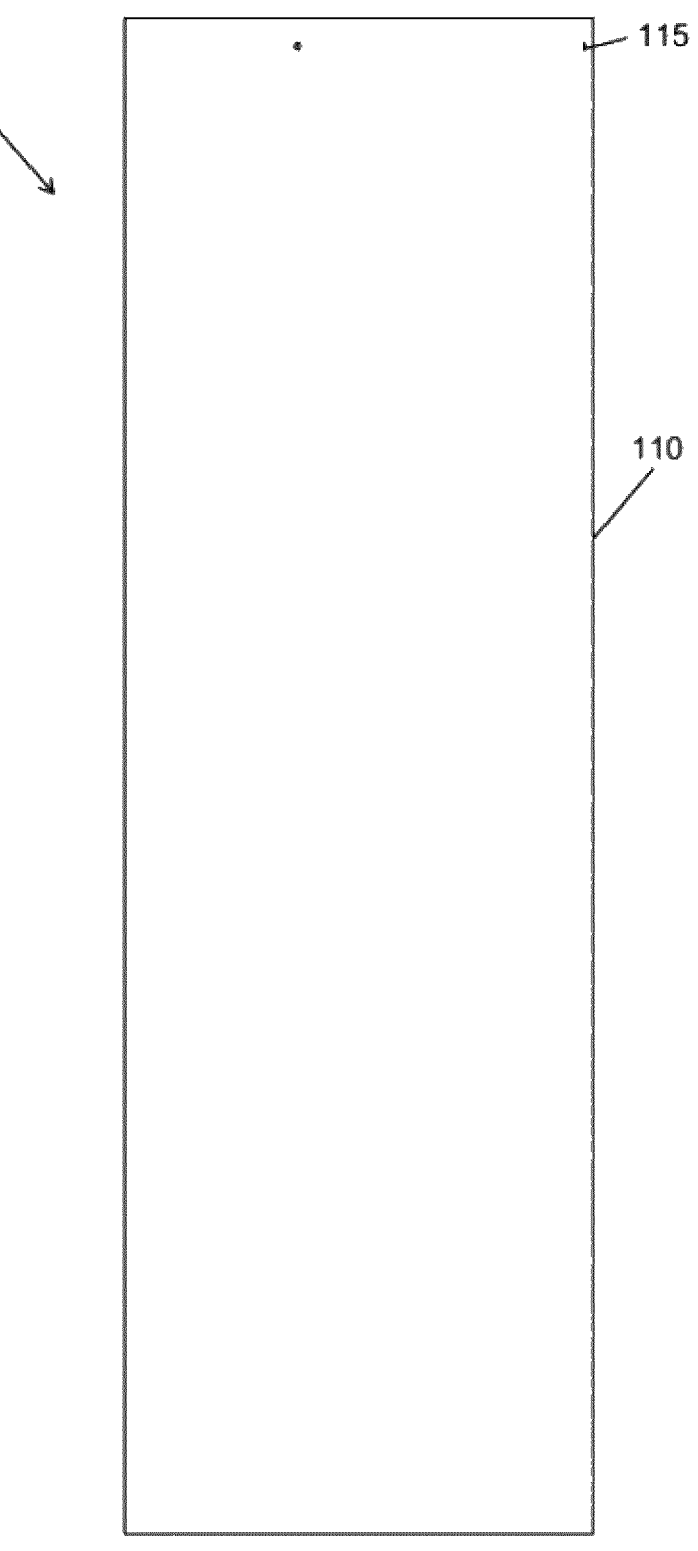
FIG. 2B is a side view of the dewar of FIG. 2A.
Figure 2C:
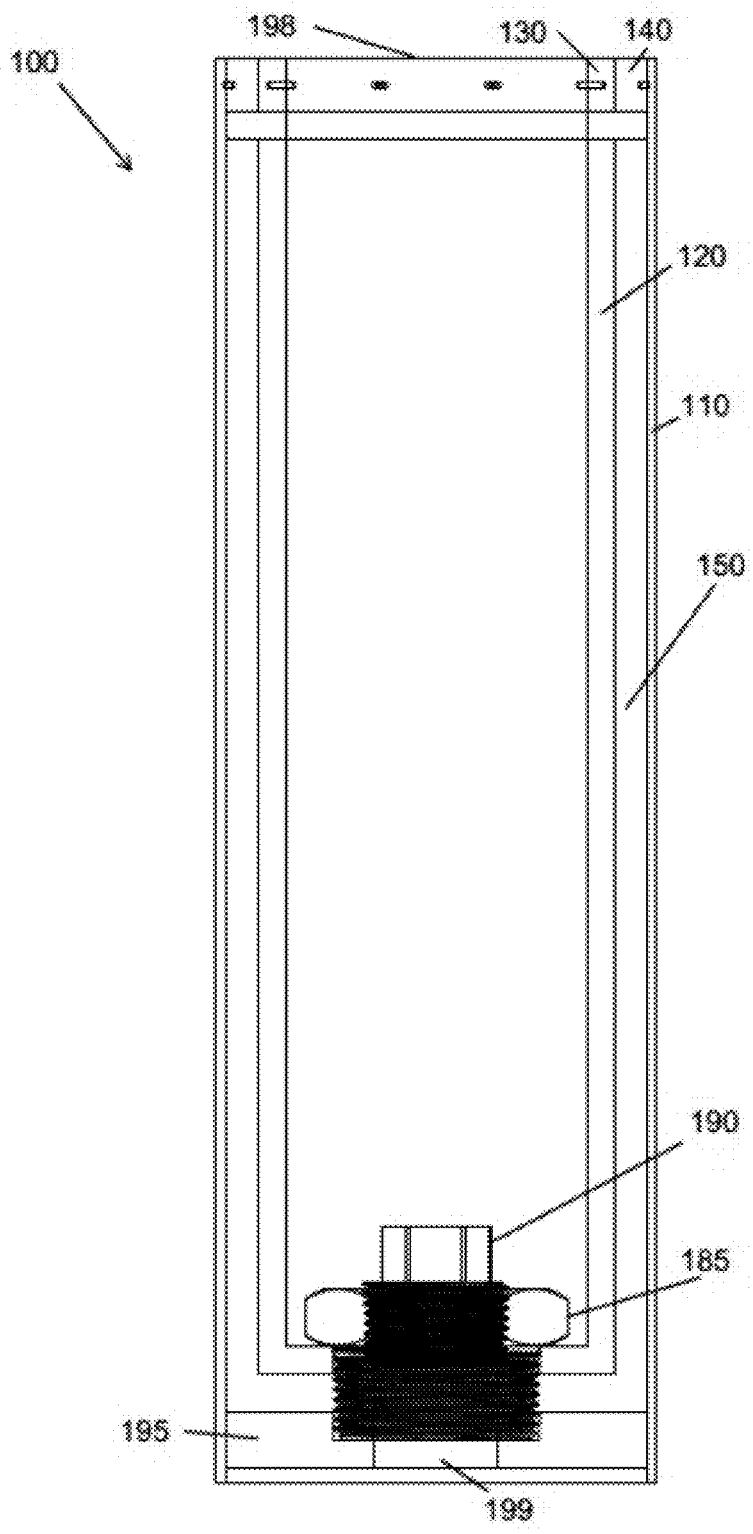
FIG. 2C is a side cross-sectional view of the dewar of FIG. 2A-B.
Figure 2D:
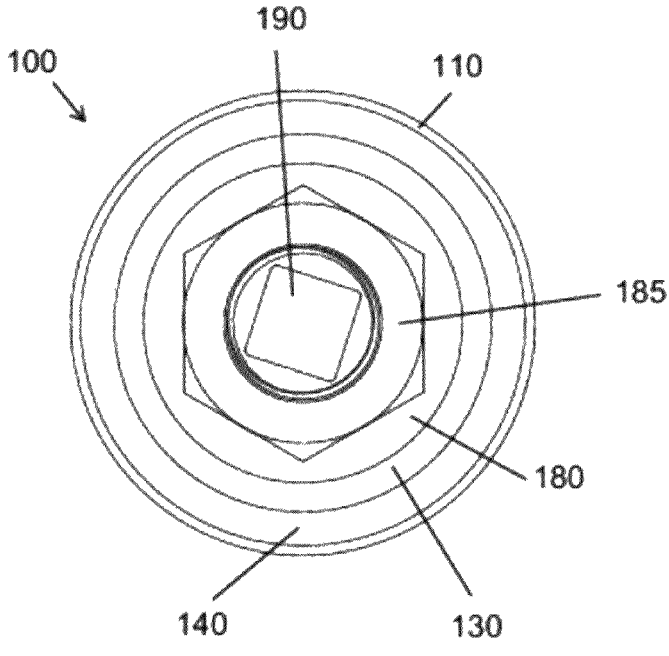
FIG. 2D is a top view of the dewar of FIG. 2A-C.
Figure 2E:
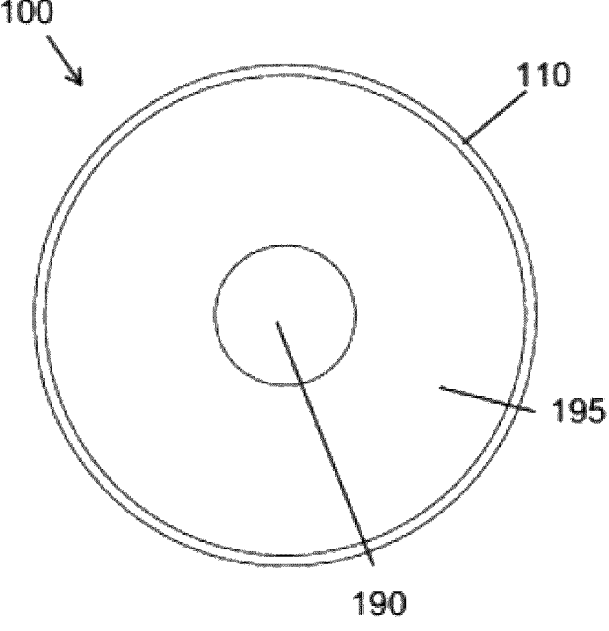
FIG. 2E is a bottom view of the dewar of FIG. 2A-D.

FIG. 1A is an illustration of an alternate embodiment of a liquid air energy storage (LAES) system. LAES system 1100 may include the cryocooler 1120, the dewar 1112, and the Stirling engine 1108.

The cryocooler 1120 is a contained system that takes electricity and cools the tip of a cryocooler cold head 1116 to very cold temperatures. Heat is rejected through the cryocooler heat sink 1118 located around the base of the cryocooler 1120. In this example, the cryocooler 1120 sits atop a plate on the vacuum insulated dewar 1112 with only the cryocooler cold head 1116 inside the dewar 1112. The cold temperature at the tip of the cryocooler cold head 1116 causes air to liquify and drop to the bottom of the dewar 1112.

The dewar 1112 is a vacuum insulated container designed to hold low-temperature liquids. This allows the liquid to be stored without immediately boiling off. A top of the dewar 1112 is designed with holes large enough to fit the Stirling cold finger 1114 and the cryocooler cold head 1116. In some embodiments, the Stirling cold finger 1114 has a 220 K temperature differential.

In this example, the Stirling engine 1108 is a linear (beta) type that had a long, copper extension (i.e., cold finger 1114)

from the head of the Stirling engine 1108 to the bottom of the dewar 1112. This allows for heat conduction to the liquid at the bottom of the dewar 1112 and improves the Stirling engine's 1108 ability to operate. Above the cold finger extension 1114, the Stirling engine 1108 sits on a plate on top of the dewar 1112, which in this example the same plate that the cryocooler 1120 sits on. The hot side of the Stirling engine 1108 is the Stirling heat sink 1110, which sits at ambient temperature. The Stirling engine 1108 rotates a pulley wheel 1106 that is connected via pulley 1104 to an electric generator 1102. When the Stirling engine 1108 operates, the electric generator 1102 can spin and generate electricity.

The LAES system 1100 can be configured to have various operating parameters. For example, air mass flowrates of 1-100 kg/h and pressure ratios of 5.9-7.0 can be used, which correspond to output pressures of 3000-6000 psi. These output pressures are within the range of estimates of best performing output pressures (2900-7200 psi).

FIGS. 2A-E illustrate a coaxial, two-opening dewar 100, with one hole at the top and another at the bottom, for implementing a low-pressure, small-scale, Stirling-Stirling liquid air energy battery. The dewar 100 includes an outer shell 110 including outer air holes 115, an inner shell 120 including inner air holes 125, an upper lip 130, an annular desiccant ring 140, an air gap between the inner shell 120 and the outer shell 110, a vapor space 180, a bushing 185, a plug 190, a disk 195, a cryocooler interface 198, and a generator interface port 199.

A free piston Stirling cryocooler liquifies air that has been dried with an integrated annular desiccant ring. The liquified air falls through the dewar vapor space and pools at the bottom of the vessel. The thermal cylinder head of a free piston Stirling generator passes through the bottom of the vessel and interfaces with a high thermal conductivity bushing and plug that conducts thermal energy from the pooled liquid to the generator.

The interior of the dewar, or inner shell, is preferably made of polytetrafluoroethylene (e.g., Teflon®) or glass). Although polytetrafluoroethylene is specifically mentioned herein, it should be understood that other fluropolymers are also contemplated in this disclosure. The top of the inner chamber may have a polytetrafluoroethylene or glass lip and a polytetrafluoroethylene or glass shelf, which creates a groove when mated with the outer shell. The outer shell may be formed from steel, polytetrafluoroethylene, or glass. This groove may be filled with desiccant pellets, thus implementing an integrated annular desiccant ring. Four holes, at 90° intervals, are present at the top of the outer shell. Off-set by 45°, four more holes are also present at the top of the polytetrafluoroethylene inner shell above the polytetrafluoroethylene shelf. Thus, dry air is ingested into the device to replace the air that has been liquified by the Stirling Cryocooler. Stirling cryocoolers may be beneficial because they have the lowest floor for power usage of cryogenic coolers, which is beneficial for connection to renewable, small-scale grids and some other applications. However, it should be understood that other types of cryocoolers are also contemplated and part of the present disclosure.

Polytetrafluoroethylene has favorable properties for cryogenic temperatures. Namely, polytetrafluoroethylene, as a thermal insulator, will reduce conductive heat transfer radially, as well as from the inner to the outer vessel via the dewar neck (a major source of losses in a traditional dewar). The lower portion of the inner chamber is threaded, and a plugged bushing (both made of high thermal conductive material) passes through the dewar air gap. This assembly serves as an interface for a Stirling generator. A counter-sunk, threaded polytetrafluoroethylene or glass disk interfaces with the bottom of the bushing in such a way as to create an air gap between the outer shell and the polytetrafluoroethylene inner shell. The outer shell slides over the disk at the bottom and over the annular shelf at the top. These serve as the only contact points for the outer shell. The gap could also be a vacuum gap.

The inner shell may be associated with a metal layer. For example, the inner shell may be wrapped in shiny, reflective foil to reduce radiative heat transfer. Alternatively, a metallic coating (e.g., a silver/mirrored paint) may be applied. The wrapped/coated inner shell is surrounded by a stagnant air gap or vacuum to reduce convective heat transfer. The gap is created by separation between the outer shell and the covered inner shell.

Features with links to the intended function include: the dewar has two, coaxial openings of different sizes to allow for interfacing with a Stirling cryocooler and Stirling generator; a polytetrafluoroethylene or glass inner chamber reduces conductive heat transfer, particularly through the dewar neck; and the dewar is fitted with an integrated, annular desiccant ring for drying low-pressure, ambient air.

In some embodiments, the inner shell, the outer shell, and the desiccant are formed (e.g., via additive manufacturing) or machined to form a unitary structure. The unitary structure may be formed from polytetrafluoroethylene.

The lower portion of the chamber may have a polytetrafluoroethylene threaded pipe attached, leading to the liquid air transport subsystem. The outer shell of the dewar provides structural support for both the inner dewar shell and the transportation system and may be capped at the bottom with a polytetrafluoroethylene disk, used to reduce conductive heating. This disk also has a hole in it to allow for a polytetrafluoroethylene pipe to go from the cyrogenic solenoid valve to the energy recovery subsystem. This bottom disk, the desiccant ring of the inner dewar shell, the outer shell, and the lower pipe constitute the pressure boundary of the dewar, allowing for a vacuum to be drawn through a vacuum ball valve attached to the stainless steel outer dewar shell. This vacuum dramatically reduces the conductive heat transfer from the outer to the inner dewar shells. Sensors (e.g., resistance temperature detectors) may be included to detect temperatures at various points in the dewar (bottom, middle, top) to indicate liquid air levels within the dewar for use in the control subsystem.

In particular embodiments, the inner shell is wrapped with both a gold and silver heat liner to reduce radiative heating of cryogenic liquid inside the dewar; two are used to maximize the spectrum of radiation reflected.

Liquid Air Transportation Subsystem

Transportation of liquid air throughout the system is facilitated by gravity. This is accomplished by using a tiered method where each major subsystem is placed above the next subsystem. The liquid air production subsystem is located above the dewar with the cold finger, where liquification occurs, allowing for the produced liquid air to directly drip into the dewar via gravity. Using gravity in this way reduces the amount of electrical loads that are produced by avoiding reliance of components such as a cryogenic pump for moving liquid air between subsystems. From the dewar, liquid air passes through a brass body cryogenic solenoid valve to the energy recovery subsystem, specifically the thermoelectric generator (TEG) container, then the valve is actuated by the control subsystem due to sensing a need for additional power on the connected microgrid. This movement of liquid air is, once again, aided by gravity. Each side of the solenoid valve is connected by dual treaded pipes (e.g., polytetrafluoroethylene pipes) that connect to the bottom of the dewar (upper pipe) and the TEG container (lower pipe).

Figure 3:
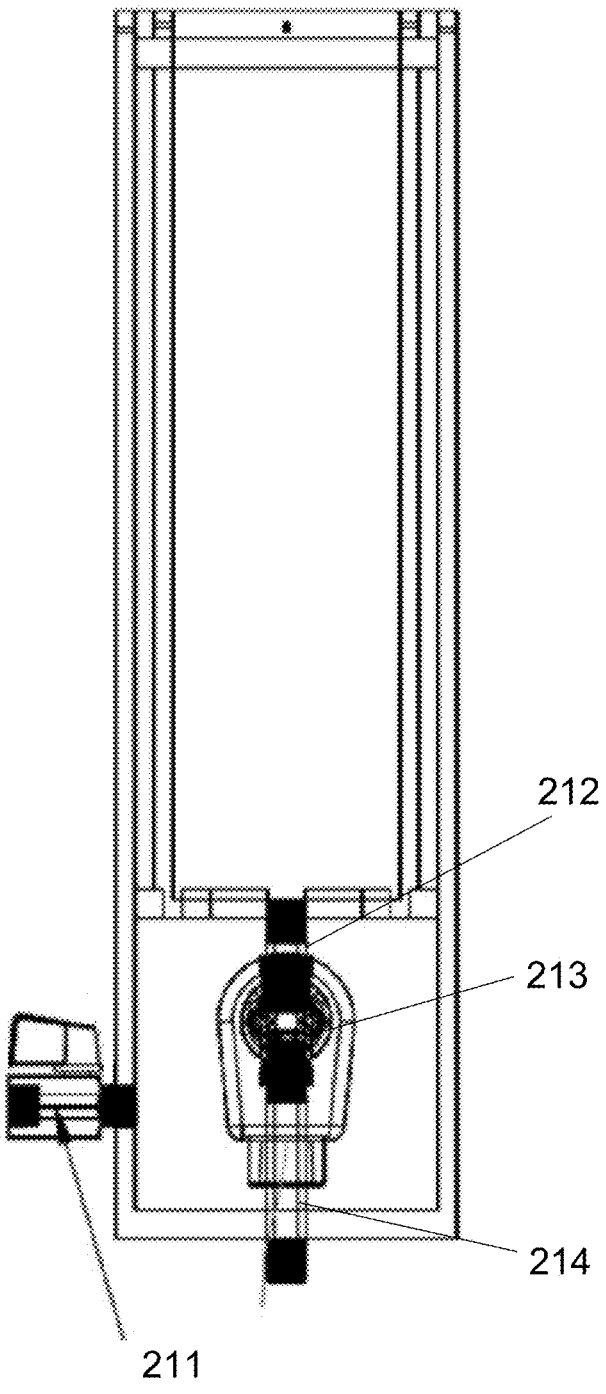
FIG. 3 illustrates a portion of a liquid air energy storage and recovery system including a transport subsystem and a dewar vacuum jacket in accordance with some embodiments of the present disclosure.

FIG. 3 illustrates a portion of a system, including a vacuum ball valve 211, an upper polytetrafluoroethylene tube 212, a solenoid valve 213, and a lower polytetrafluoroethylene tube 214.

In some embodiments, the dewar shell is formed from 304 stainless steel.

An epoxy, such as a transparent epoxy, may be utilized to form the vacuum seal.

The solenoid valve may be formed from brass.

In some embodiments, the vacuum ball valve is formed from brass.

The bottom disk may be formed from polytetrafluoroethylene.

In some embodiments, the upper tube 212 has a smaller diameter than the lower tube 214.

In particular embodiments, the upper tube has a diameter in a range of about 1 to about 1.5 inches and the lower tube has a diameter of about three inches.

Energy Recovery Subsystem

The energy recovery subsystem may include a liquid air receiver and at least one (e.g., an array of) thermoelectric generator to produce power.

Figure 4:
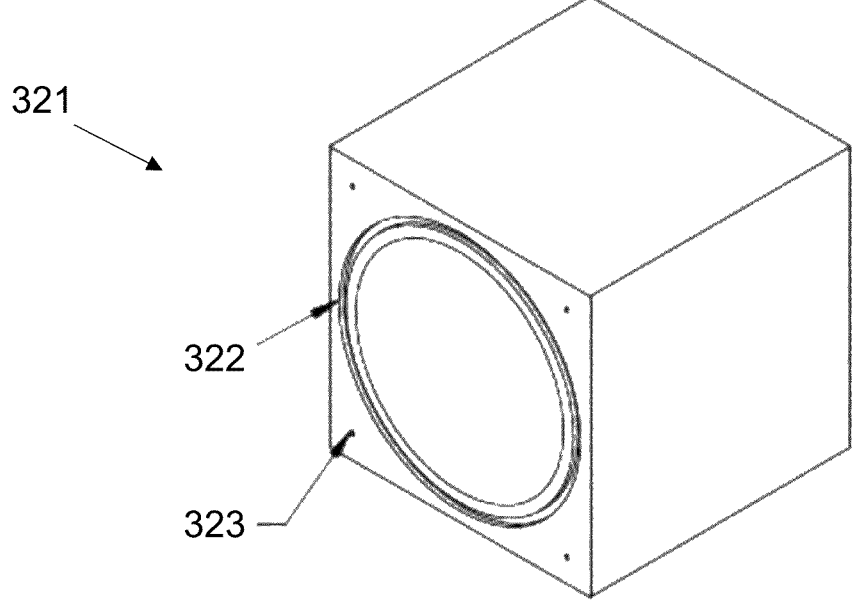
FIG. 4 illustrates a liquid air receiver and TEG container of an energy recovery subsystem in accordance with some embodiments of the present disclosure.

Referring to FIG. 4, the liquid air receiver may include a container body 321 having an O-ring groove 322 and means 323 (e.g., holes or fasteners) for connecting the body 321 to a lid.

The container body may be formed from a metal. In some embodiments, the metal is aluminum.

In some embodiments, the container body is formed from an additive manufacturing process (e.g., three-dimensional printing).

Figure 5:
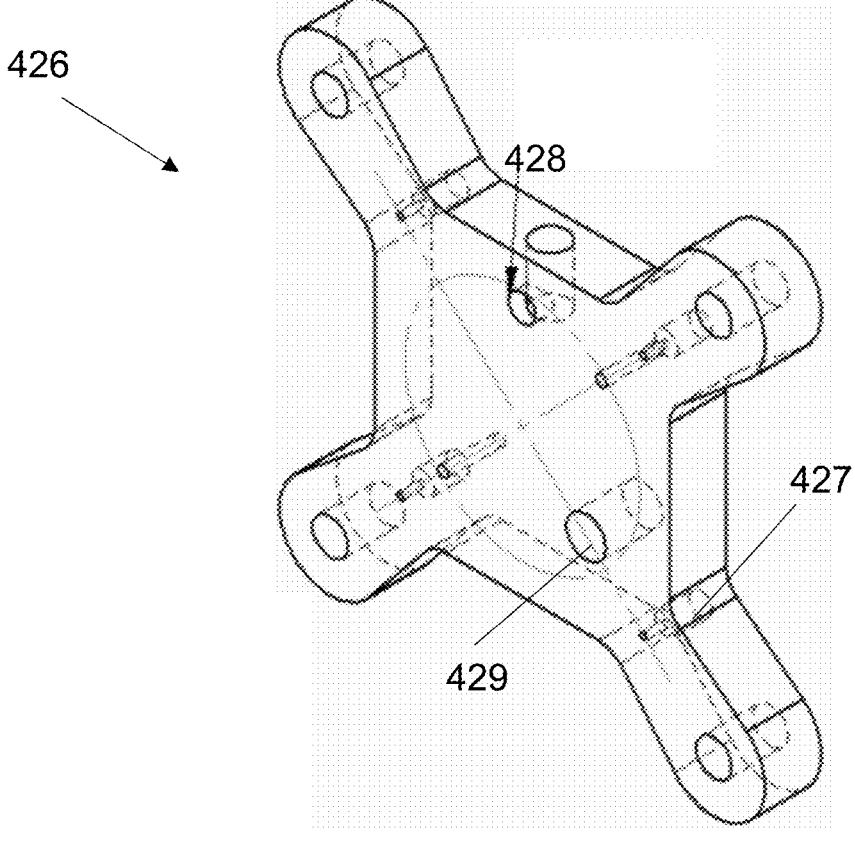
FIG. 5 illustrates a TEG container lid in accordance with some embodiments of the present disclosure.

Referring to FIG. 5, the liquid air receiver may include a TEG lid 426 including means 427 (e.g., holes or fasteners) for connecting the lid 426 to the container body, an internal vent 428, and a connection 429 for receiving the lower tube from the liquid air transportation subsystem.

The lid may be formed from an additive manufacturing process (e.g., three-dimensional printing).

In some embodiments, the lid is formed from plastic.

Figure 6:
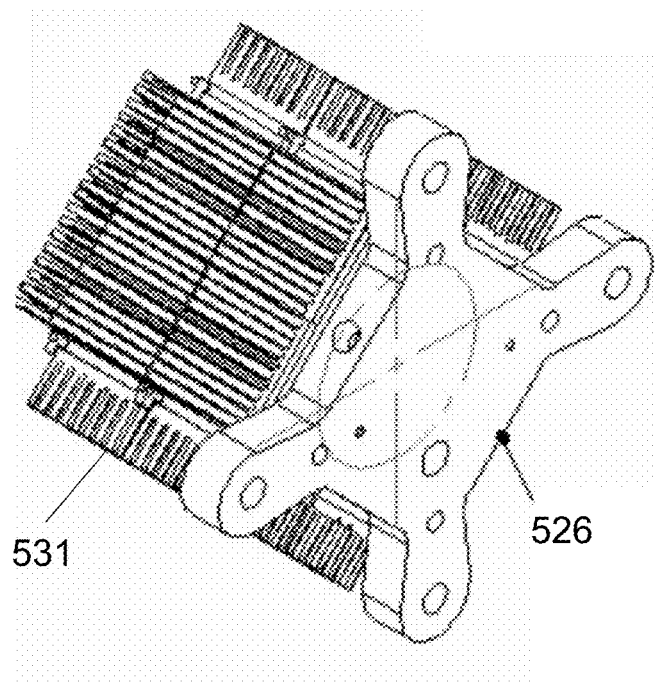
FIG. 6 illustrates a TEG assembly of an energy recovery subsystem in accordance with some embodiments of the present disclosure.

FIG. 6 depicts a TEG assembly 531 connected to a lid 526.

The TEG assembly may include TEGs formed from ceramic and P-N junction materials. In some embodiments, the TEG heatsinks are formed from aluminum.

There may be 20 TEGs and aluminum heatsinks, four on the five flat sides of the liquid air receiver and TEC container body.

Support Structure

Figure 7:
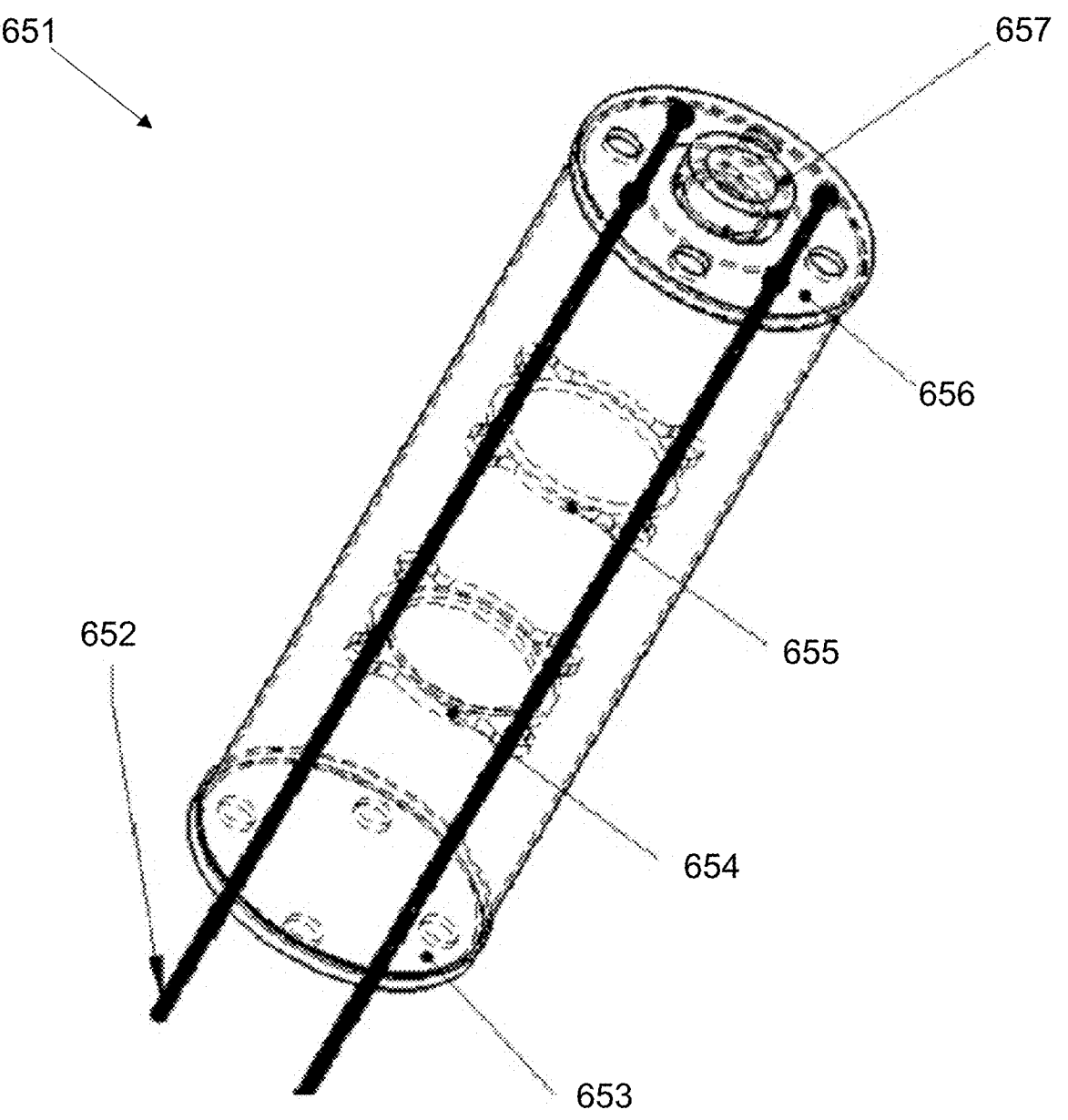
FIG. 7 illustrates a structural support of a liquid air energy storage and recovery system in accordance with some embodiments of the present disclosure.

FIG. 7 illustrates aspects of a support structure 651 for a liquid air energy storage and recovery system in accordance with some embodiments of the present disclosure. The support structure 651 includes support rods 652, a bottom support plate 653, a bottom bracket 654, a middle bracket 655, a top support plate 656, and a cryocooler support 657.

The support rods 652 may be threaded.

There may be two, three, four, five six, seven, eight, nine, ten, or more support rods.

The support rods may be formed from a metal or metal alloy. In some embodiments, the support rods contain stainless steel.

The support structure may include an outer housing. The outer housing may be formed from a polymer such as polycarbonate.

Figure 8:
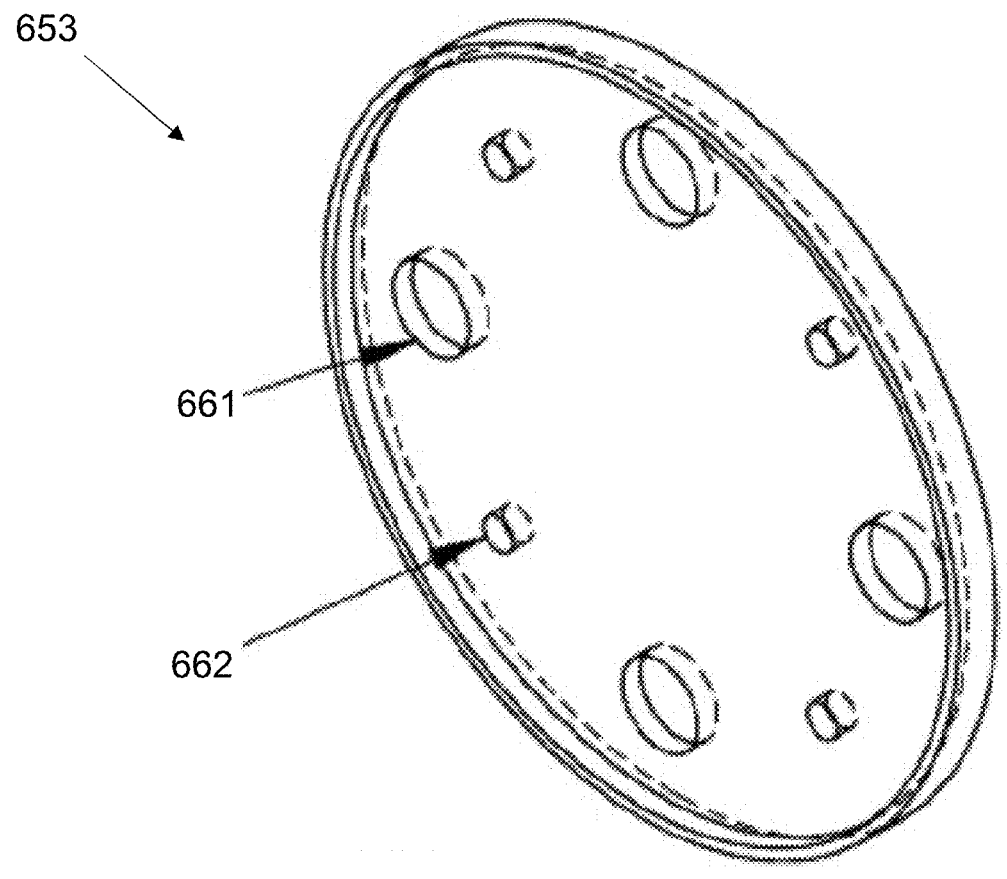
FIG. 8 illustrates a bottom support plate of the structural support of FIG. 7.

As illustrated in FIG. 8, the bottom support plate 653 may include fan and vent ports 661 and apertures 662 for receiving support rods.

The bottom support plate may be formed by an additive manufacturing process (e.g., three-dimensional printing).

In some embodiments, the bottom support plate contains a metal, such as aluminum.

Figure 9:
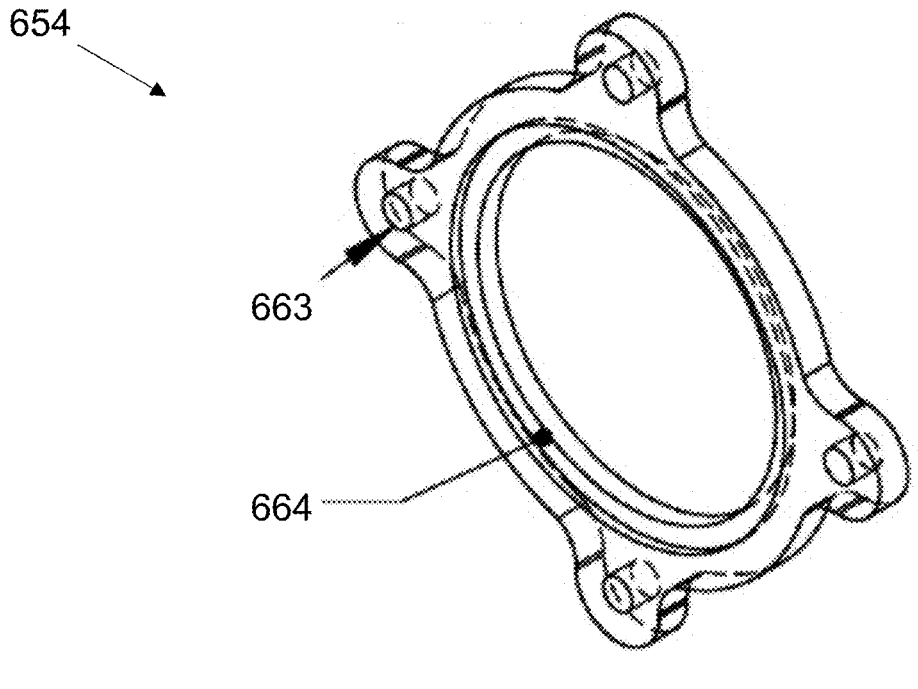
FIG. 9 illustrates a bottom bracket of the structural support of FIG. 7.

As illustrated in FIG. 9, the bottom bracket 654 may include apertures 663 for receiving support rods and a support ledge 664 for supporting the bottom of the dewar shell.

The bottom bracket may be formed by an additive manufacturing process (e.g., three-dimensional printing).

In some embodiments, the bottom bracket contains a metal, such as aluminum.

Figure 10:
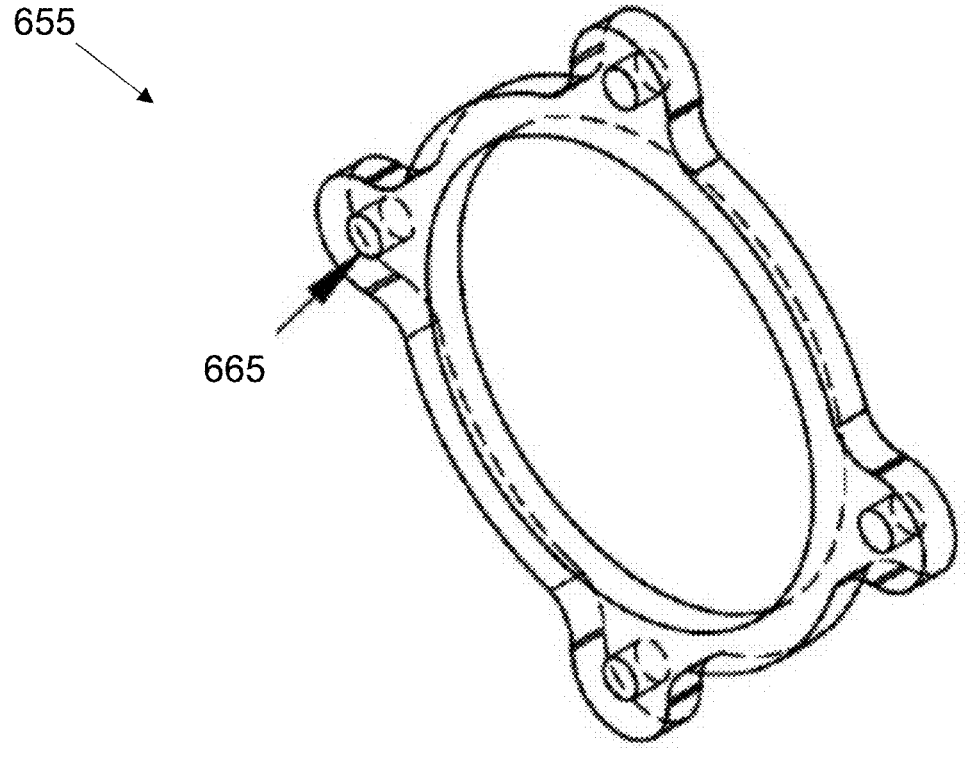
FIG. 10 illustrates a middle bracket of the structural support of FIG. 7.

As illustrated in FIG. 10, the middle bracket 655 includes apertures 665 for receiving support rods.

The middle bracket may be formed by an additive manufacturing process (e.g., three-dimensional printing).

In some embodiments, the middle bracket contains a metal, such as aluminum.

Figure 11:
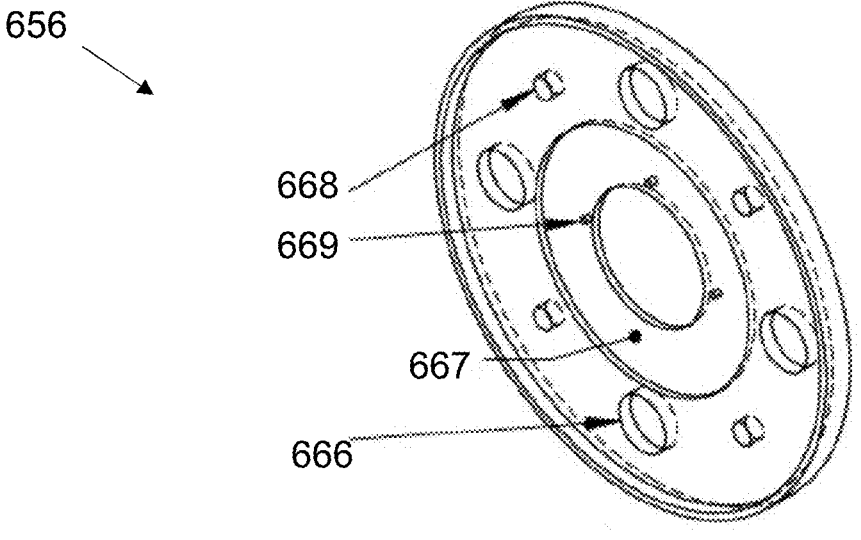
FIG. 11 illustrates a cryocooler support of the structural support of FIG. 7.

As illustrated in FIG. 11, the top support plate 656 may include fan and vent ports 666, apertures 668 for receiving support rods, a dewar upper support recess and dewar cap 667, and sensor (e.g., RTD) ports 669.

The top support plate may be formed by an additive manufacturing process (e.g., three-dimensional printing).

In some embodiments, the top support plate contains a metal, such as aluminum.

Figure 12:
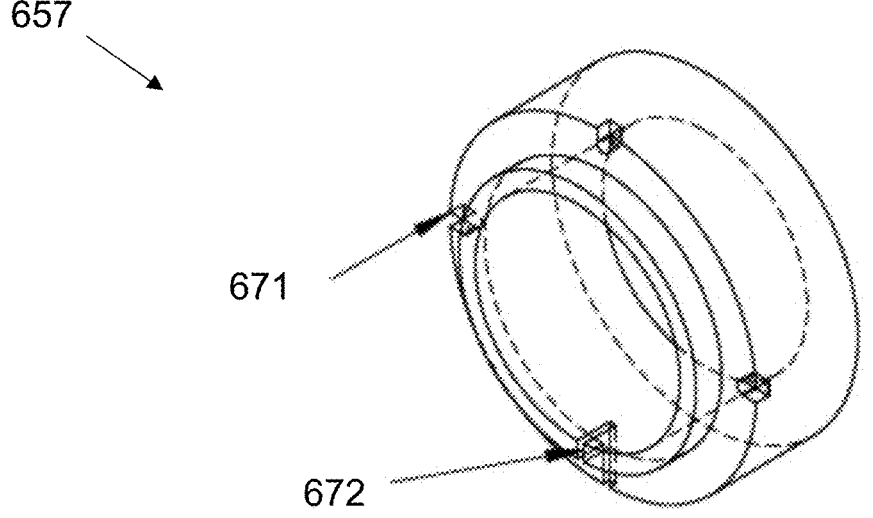
FIG. 12 illustrates a top support plate of the structural support of FIG. 7.

As illustrated in FIG. 12, the cryocooler support 657 may include sensor (e.g., RTD) ports 671 and a cryocooler sensor (e.g., RTD) port 672.

The cryocooler support may be formed by an additive manufacturing process (e.g., three-dimensional printing).

In some embodiments, the cryocooler support contains a plastic material.

Control Subsystem

The last subsystem is a control subsystem, which controls the functionality of the other four subsystems, as well as measures and records data from the system and a connected microgrid.

The control subsystem may utilize a processor, a controller (e.g., a programmable logic controller or PLC), a non-transitory computer-readable storage medium, a display, a user input device, etc.

In some embodiments, based on inputs of RTD measurements of liquid air level in dewar and TEG container as well as the energy level measurements on microgrid, the control subsystem uses a PLC and structured text coding to control the start and stop of the cryocooler for generation and start and stop of power recovery through means of the cryogenic solenoid valve.

Figure 13:
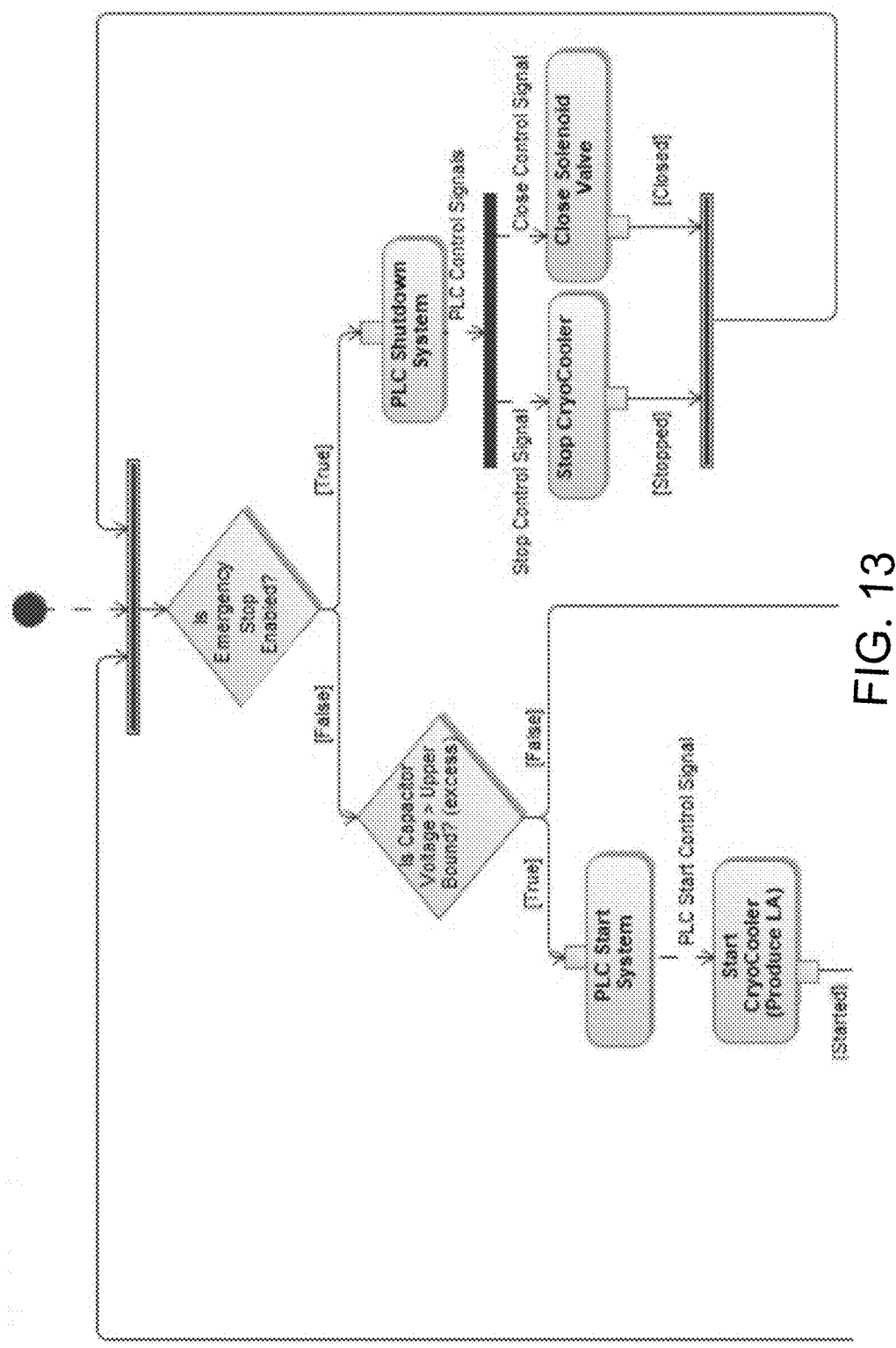
FIGS. 13 and 14 are a control flow diagram. It should be understood that the three vertical lines extending at the bottom of FIG. 13 continue to the three vertical lines extending at the top of FIG. 14.
Figure 14:
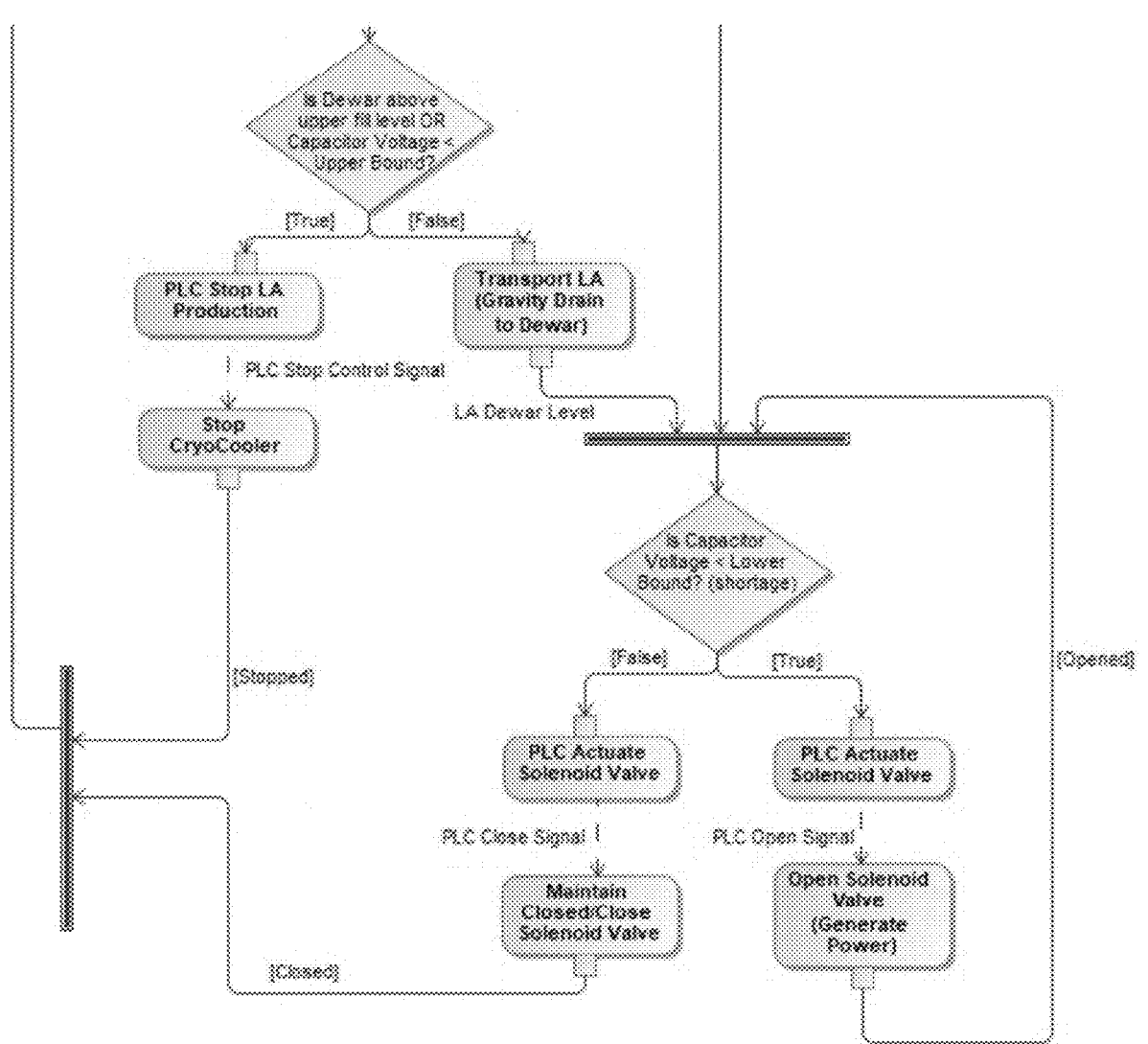

FIGS. 13 and 14 are a control flow diagram. It should be understood that the three vertical lines extending at the bottom of FIG. 13 continue to the three vertical lines extending at the top of FIG. 14.

When an emergency stop has not been enabled and a capacitor voltage exceeds an upper bound, the PLC system can be started and provide a signal to start the cryocooler, thereby producing liquid air.

When the dewar fill level is above an upper fill level or the capacitor voltage is less than an upper bound, the PLC may send a signal to stop the cryocooler.

Moreover, the capacitor voltage may be used to determine whether the PLC send an open or closed signal to the solenoid valve.

When an emergency stop is enabled, PLC shutdown system may be initiated which can provide signals to stop the cryocooler and close the solenoid valve.

FIG. 15 is a first page of control system code for a non-limiting example of the present disclosure. FIG. 16 is a second page of control system code for a non-limiting example of the present disclosure. FIG. 17 is a third page of control system code for a non-limiting example of the present disclosure. FIG. 18 is a fourth page of control system code for a non-limiting example of the present disclosure. FIG. 19 is a fifth page of control system code for a non-limiting example of the present disclosure. FIG. 20 is a sixth page of control system code for a non-limiting example of the present disclosure. FIG. 21 is a seventh page of control system code for a non-limiting example of the present disclosure.

Methods of making and using the liquid air energy storage and recovery system are also disclosed.

This written description uses examples to describe the disclosure, including the best mode, and also to enable any person skilled in the art to make and use the disclosure. Other examples that occur to those skilled in the art are intended to be within the scope of the present disclosure if they have structural elements that do not differ from the same concept, or if they include equivalent structural elements with insubstantial differences. It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An automated Stirling Peltier liquid air battery comprising:
a cryocooler configured to cool a tip of a cold head to cryogenic temperatures, the cryocooler resting in a cryocooler support and the cold head elevated in a dewar;
the dewar configured to store liquid air;
the cryocooler support to change a level of the cryocooler in the dewar to maximize liquid air production,
the dewar to hold liquid air at low temperatures, the dewar having the cryocooler support, wherein the dewar further comprises:
a polytetrafluoroethylene or glass inner shell that reduces conductive heat loss, and
a polytetrafluoroethylene or glass threaded pipe connected to a liquid air transport subsystem;
the liquid air transport subsystem connected to a thermoelectric generator to generate output electricity from the liquid air received from the dewar; and
a thermoelectric-generator configured powered fan to cool a heatsink of the cryocooler, the thermoelectric-generator having a temperature differential from heat dissipated by the heatsink.

2. The automated Stirling Peltier liquid air battery of claim 1, wherein the cryocooler is positioned above the dewar and the dewar is positioned above the liquid air transport subsystem such that the liquid air is moved by gravity.

3. The automated Stirling Peltier liquid air battery of claim 1, wherein the dewar further comprises a vacuum ball valve attached to an outer dewar shell to create a vacuum that reduces conductive heat transfer from the outer to the inner dewar shells.

4. The automated Stirling Peltier liquid air battery of claim 1, wherein the dewar further comprises:

an integrated, annular ring fitted in an upper cryocooler cavity of the dewar.

5. The automated Stirling Peltier liquid air battery of claim 1, wherein the inner shell of the dewar is covered with a metal layer.

6. The automated Stirling Peltier liquid air battery of claim 1, wherein the dewar further comprises:

an outer shell; and an air gap between the inner shell and the outer shell.

7. The automated Stirling Peltier liquid air battery of claim 6, wherein the dewar further comprises:

an integrated, annular ring fitted in an upper cryocooler cavity of the dewar;

first air holes in an outer shell of the dewar, at the integrated, annular ring; and second air holes in the inner shell of the dewar, at the integrated, annular ring.

8. The automated Stirling Peltier liquid air battery of claim 6, wherein the outer shell comprises stainless steel.

9. The automated Stirling Peltier liquid air battery of claim 1, wherein the inner shell comprises polytetrafluoroethylene.

10. A liquid air energy storage and recovery system comprising:

a liquid air production subsystem;

a liquid air storage subsystem in fluid communication with the liquid air production subsystem;

an energy recovery subsystem in fluid communication with the liquid air storage subsystem;

a liquid air transport subsystem configured to transport liquid air from the liquid air storage subsystem to the energy recovery subsystem; and a control subsystem for controlling aspects of the liquid air production subsystem; the liquid air storage subsystem the energy recovery subsystem in fluid communication with the liquid air storage subsystem; and the liquid air transport subsystem;

the energy recovery subsystem connected to a thermoelectric generator to generate output electricity from the liquid air storage subsystem; and a thermoelectric-generator configured powered fan to cool a heatsink of the cryocooler, the thermoelectric-generator having a temperature differential from heat dissipated by the heatsink.

11. The liquid air energy storage and recovery system of claim 10, wherein the liquid air production subsystem, liquid air storage subsystem, and energy recovery subsystem are arranged vertically.

12. The liquid air energy storage and recovery system of claim 10, wherein the liquid air production subsystem comprises a cryocooler.

13. The liquid air energy storage and recovery system of claim 10, wherein the liquid air storage subsystem comprises a dewar comprising a polytetrafluoroethylene or glass inner shell that reduces conductive heat loss, and a polytetrafluoroethylene or glass threaded pipe connected to the liquid air transport subsystem.

14. The liquid air energy storage and recovery system of claim 10, wherein the liquid air transport subsystem comprises a solenoid valve.

15. The liquid air energy storage and recovery system of claim 10, wherein the thermoelectric generated is part of an array of thermoelectric generators.

16. The liquid air energy storage and recovery system of claim 15, further comprising a container for housing the array of thermoelectric generators.

17. The liquid air energy storage and recovery system of claim 16, wherein the container comprises a container body and a container lid.

18. The liquid air energy storage and recovery system of claim 10, wherein the control subsystem comprises a Programmable Logic Controller (PLC) and structured text code that controls the generation, storage, an power recovery of liquid air in the system.

* * * * *